United States Patent
Story

(10) Patent No.: US 9,276,616 B2
(45) Date of Patent: Mar. 1, 2016

(54) INTEGRATED CIRCUIT CHIP INDUCTOR CONFIGURATION

(71) Applicant: QUALCOMM TECHNOLOGIES INTERNATIONAL, LTD., Cambridge (GB)

(72) Inventor: Michael John Story, Whittlesford (GB)

(73) Assignee: Qualcomm Technologies International, Ltd., Cambridge (GB)

( * ) Notice: Subject to any disclaimer, the term of this patent is extended or adjusted under 35 U.S.C. 154(b) by 101 days.

(21) Appl. No.: 14/151,943

(22) Filed: Jan. 10, 2014

(65) Prior Publication Data

US 2015/0200052 A1 Jul. 16, 2015

(51) Int. Cl.
| | | |
|---|---|---|
| H04B 1/04 | (2006.01) | |
| H04B 1/18 | (2006.01) | |
| H01F 17/00 | (2006.01) | |
| H01F 27/34 | (2006.01) | |

(52) U.S. Cl.
CPC .............. H04B 1/04 (2013.01); H01F 17/0006 (2013.01); H01F 27/346 (2013.01)

(58) Field of Classification Search
USPC .................... 455/76, 114.2, 292, 296
See application file for complete search history.

(56) References Cited

U.S. PATENT DOCUMENTS

| | | |
|---|---|---|
| 5,602,556 A | 2/1997 | Bowers |
| 6,137,447 A | 10/2000 | Saitoh et al. |
| 2006/0033602 A1 | 2/2006 | Mattsson |
| 2006/0226943 A1 | 10/2006 | Marques |
| 2009/0128210 A1* | 5/2009 | Yamamoto ..................... 327/202 |
| 2011/0248809 A1 | 10/2011 | Gertenbach et al. |
| 2012/0029343 A1* | 2/2012 | Wasson et al. ................ 600/424 |
| 2012/0244802 A1 | 9/2012 | Feng et al. |
| 2012/0268228 A1* | 10/2012 | Gertenbach et al. .......... 336/150 |

FOREIGN PATENT DOCUMENTS

| | | |
|---|---|---|
| GB | 2 509 490 A | 7/2014 |
| WO | WO 98/05048 | 2/1998 |
| WO | WO 2009/081342 A1 | 7/2009 |
| WO | WO 2013/149995 A1 | 10/2013 |

OTHER PUBLICATIONS

GB Search Report issued in related GB Application No. 1413960.4, dated Feb. 4, 2015.

* cited by examiner

*Primary Examiner* — Nguyen Vo
(74) *Attorney, Agent, or Firm* — Procopio, Cory, Hargreaves & Savitch LLP

(57) ABSTRACT

An integrated circuit chip including a first inductor; a second inductor having $n_1$ turns and located a distance $r_1$ from the first inductor; and a third inductor having $n_2$ turns and located a distance $r_2$ from the first inductor; wherein the second and third inductors are coupled so as to cause current to circulate around the second inductor in a first rotational direction and around the third inductor in a second rotational direction opposite to the first rotational direction; and wherein $n_1$, $n_2$, $r_1$ and $r_2$ are such that current induced in the first inductor due to magnetic coupling from the second inductor is negated by current induced in the first inductor due to magnetic coupling from the third inductor.

15 Claims, 6 Drawing Sheets

INTEGRATED CIRCUIT CHIP INDUCTOR CONFIGURATION

BACKGROUND

It has become increasingly common in the silicon integrated circuit (IC) industry to design so-called System on Chip (SoC) solutions. One driving force behind this trend is the ever present desire to minimise the chip area required to perform the required functionality of the chip, and hence ultimately reduce the size and weight of the electronic devices into which the chip is incorporated.

Reducing the size of the components on the chip is not the only problem encountered in realising a more compact design. Another problem is that the components must be positioned closer to each other on the chip. This is problematic for circuitry surrounding inductors, because inductors radiate magnetic fields that interfere with the operation of the surrounding circuitry. This interference issue is particularly problematic when two or more inductors are located on the same chip. In this situation, each inductor couples with the other inductors (called cross coupling). This is as a result of the current flowing through each inductor inducing a magnetic field which radiates to the other inductors and induces voltages (and so currents) in those inductors. This cross coupling changes the operation of all the inductors involved. For example, if an inductor is used in a voltage controlled oscillator (VCO) then cross coupling from other inductors changes the current through the inductor and hence changes the resonant frequency of the VCO.

It is not possible to prevent a magnetic field from being created by an on-chip inductor. However, efforts have been made to alleviate the cross-coupling issue when designing the layout of a chip comprising more than one inductor. One approach taken is to locate inductors on a chip as far apart from each other as possible given other design constraints. Since the strength of the magnetic field radiated from an inductor is inversely proportional to the cube of the radial distance from the inductor, the greater the separation of inductors on a chip, the less they interfere with each other's operation.

Separating the inductors on a chip only results in a partial reduction of their cross-coupling. Additionally, inductors are often adjacent components in a signal path. Thus, separating these inductors on the chip requires additional wiring to connect them together. If, due to other design constraints, inductors have to be physically close to each other on a chip, then typically other circuitry is incorporated on the chip in order to counter the effects of the cross-coupling. For example the output of a VCO may be frequency shifted outside the VCO with additional circuitry in order to counter the pulling effect of a nearby inductor. Such additional circuitry drains power and utilises chip area. This solution is not desirable given market demand for ever smaller and lower power/longer battery life electronic devices. Additionally, as chips get smaller to satisfy market demand, an inevitable consequence is that the maximum separation of inductors decreases, and hence the cross-coupling effects worsen.

Thus, there is a need for an improved inductor configuration on an integrated circuit chip which alleviates cross-coupling using a lower power, more space-saving solution than those described above.

SUMMARY OF THE INVENTION

According to a first aspect, there is provided an integrated circuit chip comprising: a first inductor; a second inductor having $n_1$ turns and located a distance $r_1$ from the first inductor; and a third inductor having $n_2$ turns and located a distance $r_2$ from the first inductor; wherein the second and third inductors are coupled so as to cause current to circulate around the second inductor in a first rotational direction and around the third inductor in a second rotational direction opposite to the first rotational direction; and wherein $n_1$, $n_2$, $r_1$ and $r_2$ are such that current induced in the first inductor due to magnetic coupling from the second inductor is negated by current induced in the first inductor due to magnetic coupling from the third inductor.

Suitably, $$\frac{n_1}{r_1^3} = \frac{n_2}{r_2^3}.$$

Suitably, the second inductor and the third inductor are connected in series.

Suitably, the integrated circuit chip further comprises transmitter circuitry having a transmit signal path, wherein the second inductor and the third inductor are located on the transmit signal path.

Suitably, the integrated circuit chip further comprises a local oscillator configured to drive a frequency mixer on the transmit signal path, wherein the local oscillator comprises the first inductor.

Suitably, the first, second and third inductors are configured to operate at the same frequency.

Suitably, the local oscillator is configured to drive a frequency mixer on the receive signal path, wherein the local oscillator comprises the third inductor.

Suitably, the first inductor is located on the receive signal path. Suitably, the second inductor is located on the receive signal path. Suitably, the second inductor is also located on the transmit signal path.

Suitably, the second inductor comprises a first turn and one or more further turns, each of the one or more further turns circumscribing the first turn.

Suitably, the third inductor comprises a first turn and one or more further turns, each of the one or more further turns circumscribing the first turn.

Suitably, the second inductor has a spiral shape. Suitably, the third inductor has a spiral shape. Suitably, the first inductor has a spiral shape.

Suitably, the first inductor, the second inductor and the third inductor are formed by metallisation on a substrate.

Suitably, the first inductor, the second inductor and the third inductor are located on the same plane.

BRIEF DESCRIPTION OF THE DRAWINGS

The present disclosure will now be described by way of example with reference to the accompanying drawings. In the drawings.

DETAILED DESCRIPTION

The following description is presented by way of example to enable any person skilled in the art to make and use the invention. The present invention is not limited to the examples described herein and various modifications to the disclosed examples will be readily apparent to those skilled in the art.

It will be understood in the description that follows that the configuration of a group of inductors on an integrated circuit chip is arranged so as to negate the cross-coupling effects in one of the inductors in the group. The magnetic fields induced in one inductor by the other inductors in the group substantially completely cancel, such that the resultant induced magnetic field in that one inductor is significantly reduced. The characteristics described in the description are not intended to necessarily confer absolute cancellation of induced magnetic field components in one inductor as a result of the configuration of the group of inductors. Consequently, references in the description to specific relative locations of the inductors are to be interpreted to mean that those inductors are to be located close enough to the specified locations that significant cancellation of induced magnetic field components in one inductor by the other inductors in the group is achieved. Similarly, references to equalities of areas, sizes, shapes, lengths, magnetic fluxes or similar are to be interpreted to mean that the degree of similarity between the compared quantities is such that substantial cancellation of induced magnetic field components in one inductor by the other inductors in the group is achieved. Similarly, references to an inductor or parts of an inductor being symmetrical about an axis are to be interpreted to include such inductors or parts of inductors that, although not exactly symmetrical about the axis, are close enough to exhibiting the mentioned symmetry that substantial cancellation of induced magnetic field components in one inductor by the other inductors in the group is achieved.

The inductors described herein operate using alternating current (a.c.). The following description describes the operation of the inductors when the current flows in a first direction. It will be understood that when the current alternates such that it flows in the opposite rotational direction, the converse operation to that described below applies.

Figure 1:
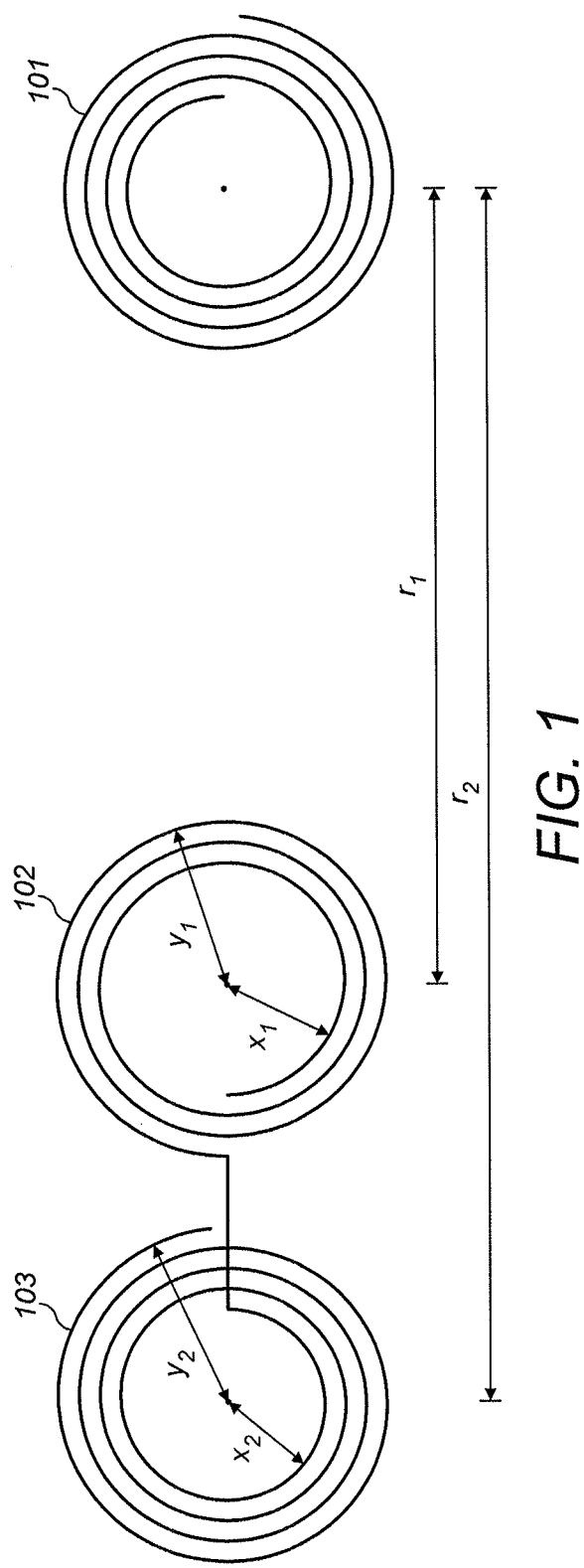
FIG. 1 illustrates an exemplary inductor configuration in a linear arrangement.

FIG. 1 shows a schematic diagram of the general arrangement of a configuration of a group inductors on an integrated circuit chip. FIG. 1 illustrates three inductors: inductor 101, inductor 102 and inductor 103. Three inductors are shown on FIG. 1 for illustration purposes only. The group of inductors may include more than three inductors.

Inductor 102 and inductor 103 are coupled to each other so as to cause current to circulate around inductor 102 in a first rotational direction and around inductor 103 in a second rotational direction opposite to the first rotational direction. In other words, inductors 102 and 103 are connected such that when current flows through inductor 102 in a clockwise direction, it flows through inductor 103 in an anti-clockwise direction. Similarly, when current flows through inductor 102 in an anti-clockwise direction, it flows through inductor 103 in a clockwise direction. In the example of FIG. 1 this is achieved by the turns of inductor 102 being wound in an opposite direction to the turns of inductor 103. In this case, working from the centre of the inductor outwards, inductor 103 is wound in a clockwise direction and inductor 102 is wound in an anticlockwise direction. In an alternative example, working from the centre of the inductor outwards, inductor 103 is wound in an anti-clockwise direction and inductor 102 is wound in a clockwise direction. Inductors 102 and 103 are connected in series. Thus, when current flows around inductor 102 in a clockwise direction, it flows around inductor 103 in an anti-clockwise direction. Similarly, when current flows around inductor 103 in a clockwise direction, it flows around inductor 102 in an anti-clockwise direction.

In the example of FIG. 1, inductors 102 and 103 are spiral inductors. Alternatively inductors 102 and 103 may have an alternative profile which causes current to circulate around inductor 102 in a first rotational direction and around inductor 103 in a second rotational direction opposite to the first rotational direction. Suitably, inductors 102 and 103 have the same profile. In one example, both inductors 102 and 103 are spiral inductors. In another example, both inductors 102 and 103 have a four-sided profile. For example, both inductors 102 and 103 have a square profile. In a further example, both inductors 102 and 103 have an octagonal profile.

By causing current to circulate around inductor 102 in an opposite rotational direction to its circulation around inductor 103, the magnetic field generated by inductor 102 is in the opposite direction to the magnetic field generated by inductor 103. For example, when current circulates around inductor 102 in a clockwise direction, the magnetic field generated inside the inductor 102 is directed out of the plane of the inductor at right angles to the plane of the inductor 102. At the same time, current circulates around inductor 103 in an anti-clockwise direction. The magnetic field generated inside the inductor 103 is also directed out of the plane of the inductor at right angles to the plane of the inductor 103, but at 180° to the magnetic field generated by inductor 102. In terms of FIG. 1, the magnetic field generated by inductor 102 is out of the plane of the figure, whereas the magnetic field generated by inductor 103 is into the plane of the figure. Thus, at some locations external to the inductors 102 and 103, substantial cancellation of the magnetic field components generated by inductor 102 is achieved by the magnetic field components generated by inductor 103.

Inductor 102 is located a distance $r_1$ from inductor 101 on the integrated circuit chip. Inductor 103 is located a distance $r_2$ from inductor 101 on the integrated circuit chip. Suitably, the distance between the centre of inductor 101 and the centre of inductor 102 is $r_1$. Suitably, the distance between the centre of inductor 101 and the centre of inductor 103 is $r_2$.

Inductor 102 has $n_1$ turns. Suitably inductor 102 comprises a first turn and one or more further turns. Each of the one or more further turns circumscribes the first turn. Suitably, $n_1$ is greater than 1. For example, $n_1$ is 3. Inductor 103 has $n_2$ turns. Suitably inductor 103 comprises a first turn and one or more further turns. Each of the one or more further turns circumscribes the first turn. Suitably, $n_2$ is greater than 2. For example, $n_2$ is 4. Suitably, $n_1$ is less than $n_2$. Increasing the number of turns of each inductor, increases the inductance value of the inductor for the same footprint.

The internal radius is the radial distance between the centre of the inductor and the innermost turn of the inductor, illustrated as $x_1$ and $x_2$ on FIG. 1. The external radius is the radial distance between the centre of the inductor and the outermost turn of the inductor, illustrated as $y_1$ and $y_2$ on FIG. 1. Spiral inductors having the same shape, internal radius, external radius, number of turns and spacing between their turns have the same dipole size if the area that they bound is the same. Suitably, inductor 102 has a different dipole size to inductor 103. Suitably, the effective radius $R_1$ of inductor 102 is different to the effective radius $R_2$ of inductor 103. Suitably, inductors 102 and 103 have different numbers of turns. Suitably, the spacing between the turns of inductor 102 is different to the spacing between the turns of inductor 103.

For inductors 102 and 103, the mutual inductance at inductor 101 as a result of the magnetic coupling from inductors 102 and 103 follows the following relationship:

$$M \propto \frac{i_1 n_1 R_1^2}{r_1^3} + \frac{i_2 n_2 R_2^2}{r_2^3} \qquad \text{(equation 1)}$$

where, M is the mutual inductance, $i_1$ is the current through inductor 102 and $i_2$ is the current through inductor 103. When the current $i_1$ flowing through inductor 102 is equal and opposite to the current $i_2$ through inductor 103, then the mutual inductance M can be expressed as:

$$M \propto \frac{n_1 R_1^2}{r_1^3} - \frac{n_2 R_2^2}{r_2^3} \qquad \text{(equation 2)}$$

The mutual inductance in inductor 101 as a result of inductors 102 and 103 is negated when the following equation is satisfied:

$$\frac{n_1 R_1^2}{r_1^3} = \frac{n_2 R_2^2}{r_2^3} \qquad \text{(equation 3)}$$

In other words, the current induced in the inductor 101 due to the magnetic coupling from the inductor 102 is negated by the current inducted in the inductor 101 due to the magnetic coupling from the inductor 103 when equation 3 is satisfied.

In the example of FIG. 1:

$$r_1 + \delta r = r_2 \qquad \text{(equation 4)}$$

Thus, equation 3 can be re-written in terms of $r_2$ as:

$$r_2 = \frac{\delta r^3 \sqrt{n_1 R_1^2}}{\sqrt[3]{n_1 R_1^2} - \sqrt[3]{n_2 R_2^2}} \qquad \text{(equation 5)}$$

The effective radius $R_1$ and the number of turns $n_1$ of inductor 103 is different to the effective radius $R_2$ and number of turns $n_2$ of inductor 102 in order for equation 5 to yield a real number for the distance $r_2$.

Figure 6:
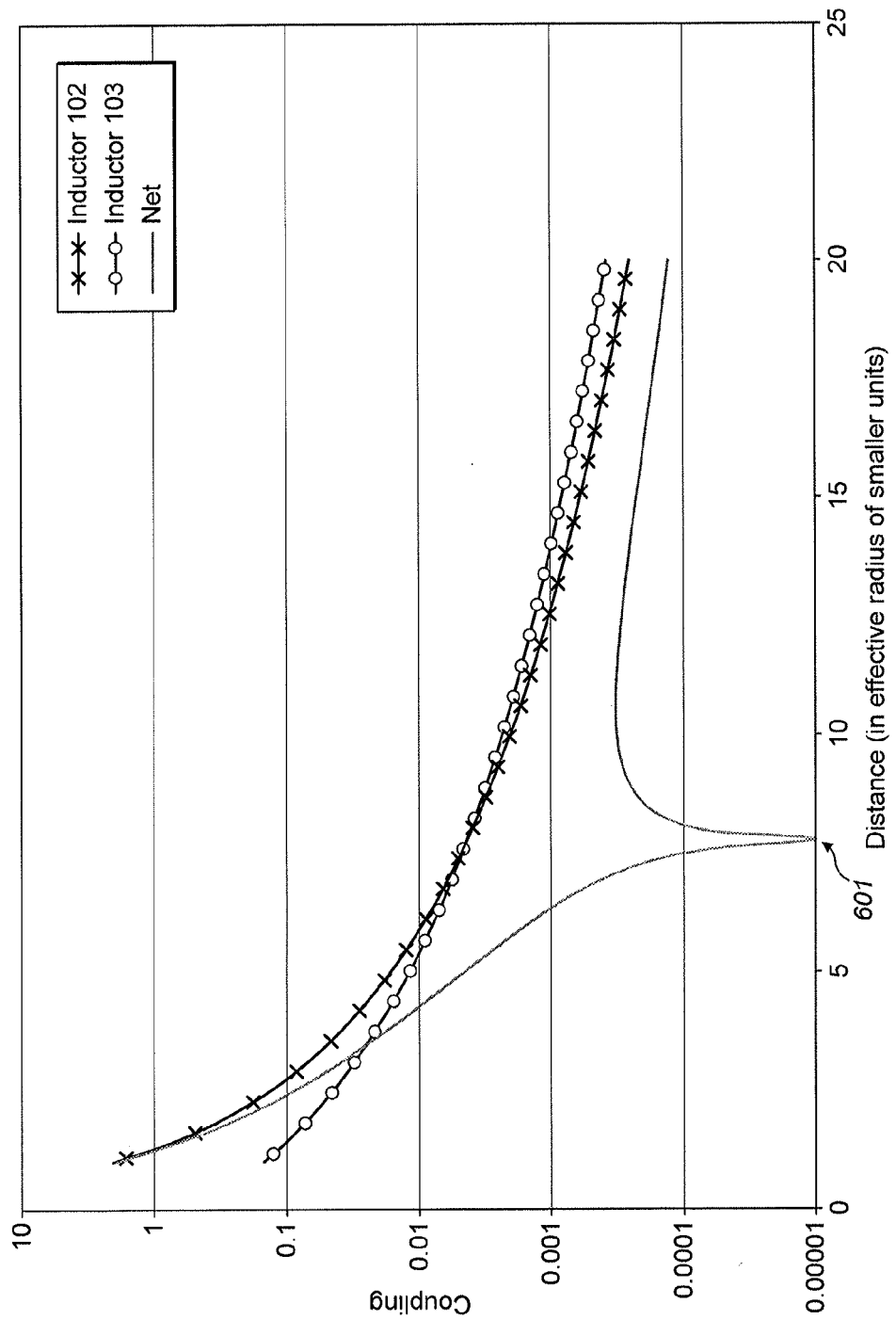
FIG. 6 illustrates the coupling of two inductors.

FIG. 6 illustrates the coupling of two inductors, such as inductors 102 and 103. Inductors 102 and 103 have different effective radii and different numbers of turns. Thus, the coupling of each inductor is different. The net coupling of the two inductors has a null at the point marked 601 in FIG. 6. Suitably, inductor 101 is located at this null.

If the currents $i_1$ and $i_2$ are in anti-phase but do not have equal magnitude, then the mutual inductance in inductor 101 as a result of inductors 102 and 103 is negated when the following equation is satisfied:

$$\frac{i_1 n_1 R_1^3}{r_1^3} = \frac{i_2 n_2 R_2^3}{r_2^3} \qquad \text{(equation 6)}$$

Inductors 101, 102 and 103 of FIG. 1 are located in line, thus the equations above have been treated as scalar equations with scalar solutions. For out of alignment inductors as, for example, shown in FIG. 2, the same equations apply, but with vector solutions.

FIG. 1 illustrates an inductor configuration in which the centres of inductors 101, 102 and 103 are in a straight line. The inductors 102 and 103 which are coupled together are adjacent to one another. The inductor 101 is distal to the inductors 102 and 103. This linear arrangement of inductors 101, 102 and 103 is one example. There are other exemplary arrangements of inductors 101, 102 and 103 which satisfy the relationship in equation 6 when the currents through inductors 102 and 103 are in anti-phase.

Figure 2:
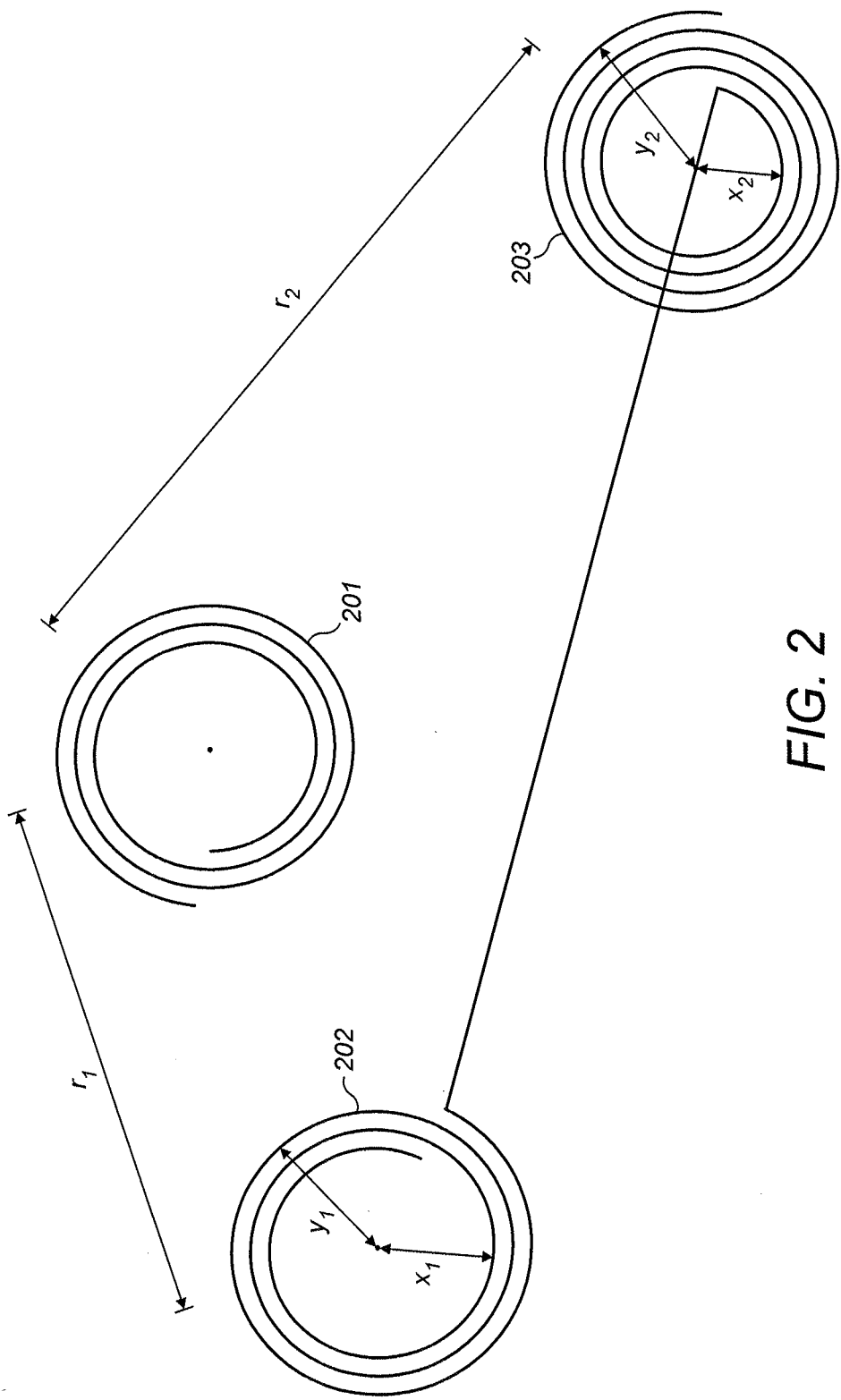
FIG. 2 illustrates an exemplary inductor configuration in a non-linear arrangement.

For example, FIG. 2 illustrates an arrangement of three inductors 201, 202 and 203. Inductors 202 and 203 are coupled together such that when current circulates around inductor 202 in a clockwise direction, it circulates around inductor 203 in an anti-clockwise direction. Similarly, when current circulates around inductor 202 in an anti-clockwise direction, it circulates around inductor 203 in a clockwise direction. The shape and operation of inductors 202 and 203 is as described with respect to FIG. 1 for inductors 102 and 103. The shape and operation of inductor 201 is as described with respect to FIG. 1 for inductor 101. The difference between the arrangement of FIG. 1 and the arrangement of FIG. 2 is the relative locations of the three inductors. The centres of inductors 201, 202 and 203 are not in a straight line. The inductors 202 and 203 which are coupled together are not adjacent to one another. Inductor 201 is between inductors 202 and 203. The arrangement of FIG. 2 satisfies the relationship expressed by equation 6.

The examples above describe configurations of three inductors. Other examples have configurations of more than three inductors. The mutual inductance of one inductor in the group as a result of the other inductors in the group is negated when the following equation is satisfied:

$$\sum_{k=1}^{N} \frac{i_k R_k^2 n_k}{r_k^3} = \sum_{j=1}^{N} \frac{i_j R_j^2 n_j}{r_j^3} \qquad \text{(equation 7)}$$

where the k and j inductors are configured such that when current flows around the k inductors in one rotational direction, it flows around the j inductors in the opposite rotational direction. N is a limit determined by the size of the inductors and the integrated circuit chip on which the inductors are located.

Thus, the current induced in one inductor due to the magnetic coupling from the surrounding inductors is negated when equation 7 is satisfied.

Figure 3:
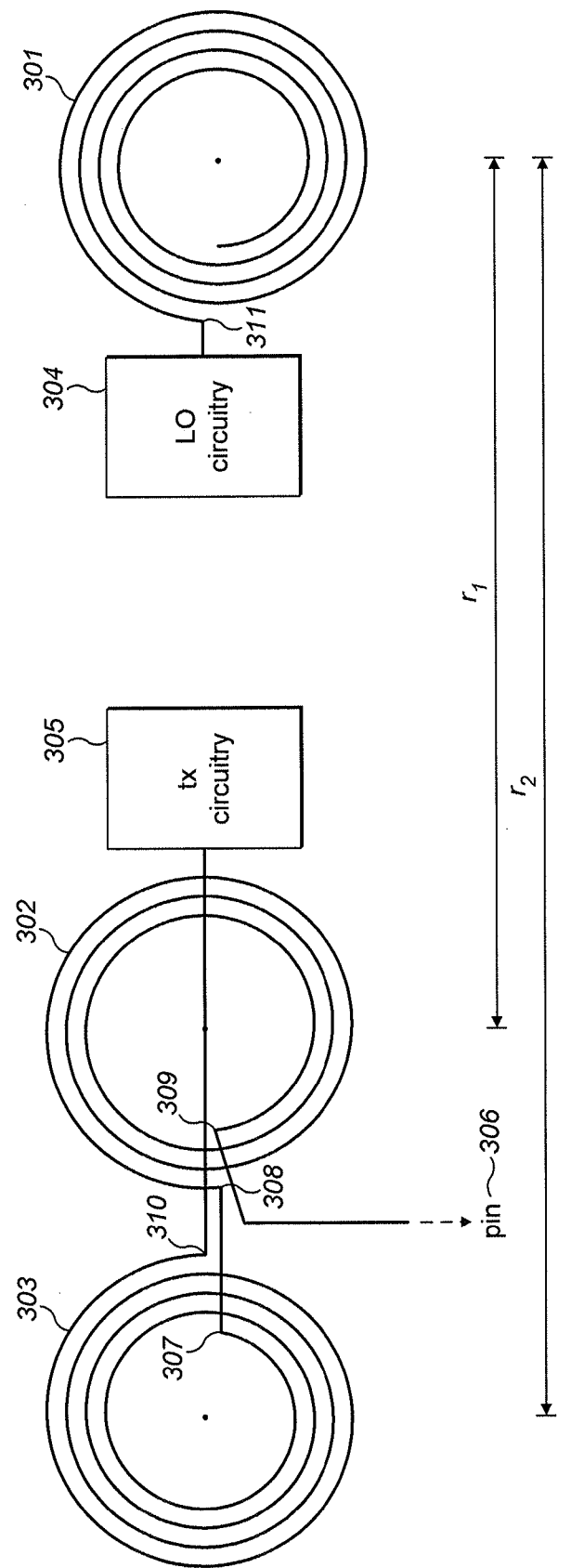
FIG. 3 illustrates an exemplary inductor configuration in transmitter circuitry on an integrated circuit chip.

Turning to FIG. 3, FIG. 3 illustrates an implementation of the described inductor configuration in transmitter circuitry on an integrated circuit chip. FIG. 3 illustrates three spiral inductors: inductors 301, 302 and 303. The shape and operation of inductors 302 and 303 is as described with respect to FIG. 1 for inductors 102 and 103. The shape and operation of inductor 301 is as described with respect to FIG. 1 for inductor 101. Inductors 302 and 303 form part of the transmit chain. In other words, inductors 302 and 303 are located on the transmit signal path.

One end of inductor 302 is connected to one end of inductor 303. For example, the innermost end 307 of inductor 303 is connected to the outermost end 308 of inductor 302. Thus, inductors 302 and 303 are connected in series such that when current flows around inductor 302 in one rotational direction, it flows around inductor 303 in the opposite rotational direction. The other end 309 of inductor 302 is connected to a chip pin 306 of the integrated circuit chip. This connection provides the signal path of a signal to be transmitted to the antenna. The other end 310 of inductor 303 is connected to on-chip transmitter circuitry 305. This on-chip transmitter circuitry 305 includes, for example, baseband and intermediate frequency (IF) processing. Suitably, on-chip transmitter circuitry 305 includes a power amplification stage.

Inductor 301 forms part of a local oscillator. Inductor 301 is connected at one end 311 to further local oscillator circuitry 304. Suitably, the local oscillator drives a frequency mixer on the transmit signal path. The local oscillator may also drive a frequency mixer on the receive signal path.

Figure 5:
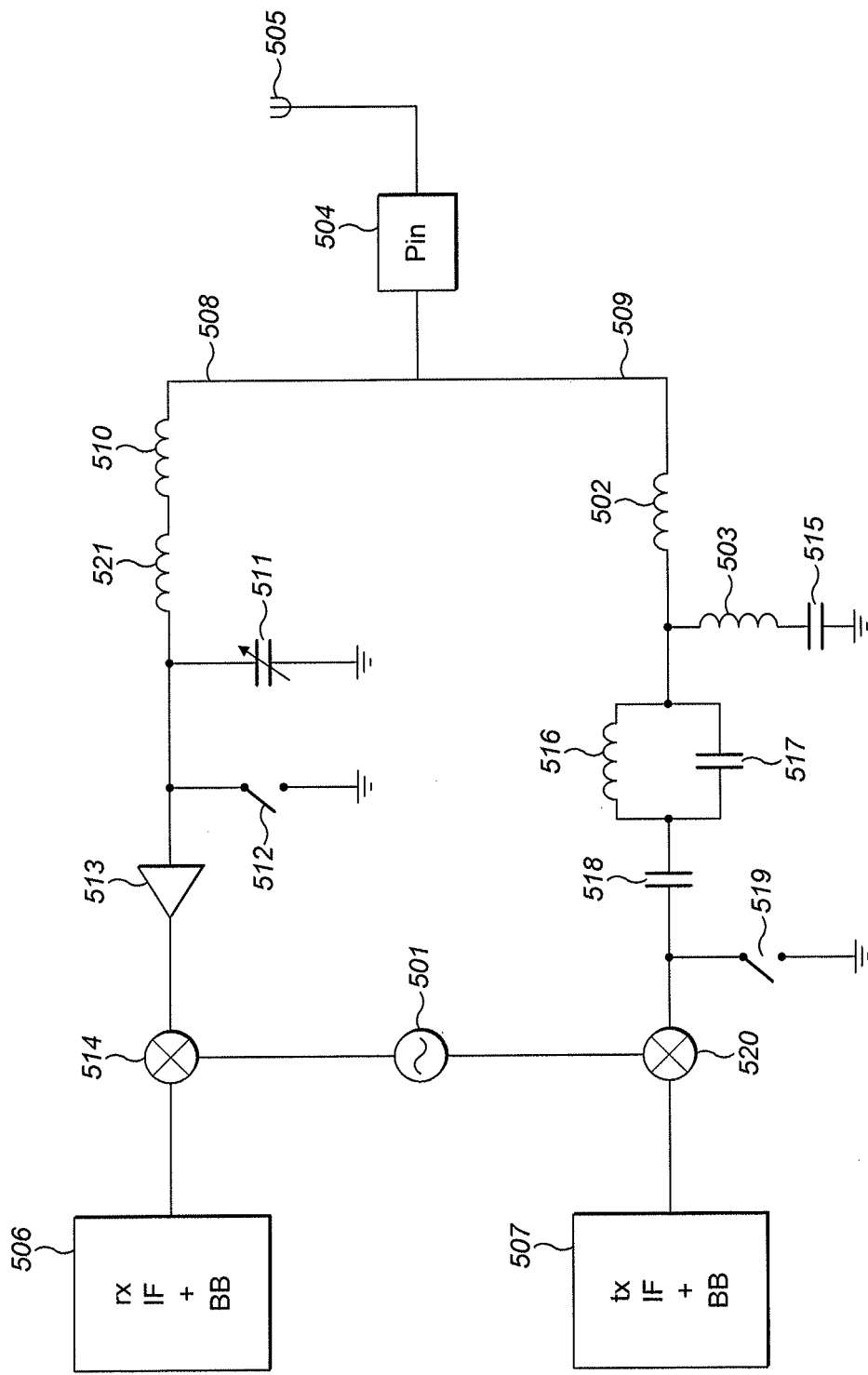
FIG. 5 illustrates exemplary transceiver circuitry into which the inductor configurations of FIG. 3 and/or FIG. 4 may be incorporated.

FIG. 5 illustrates exemplary transceiver circuitry into which the inductor arrangement of FIG. 3 may be incorporated. Chip pin 504 is connected to antenna 505. Antenna 505 is suitably off-chip. Chip pin 504 is also connected to receive IF and baseband processing unit 506 via signal branch 508, and to transmit IF and baseband processing unit 507 via signal branch 509.

Signal branch 508 is predominantly the receive signal path. Signal branch 508 comprises inductors 510 and 521 located adjacent to pin 504. Capacitor 511 couples the signal branch 508 to ground between inductor 521 and IF and baseband processing unit 506. Switch 512 couples the signal branch 508 to ground between capacitor 511 and the IF and baseband processing unit 506. Low noise amplifier (LNA) 513 is on the signal branch 508 between the switch 512 and the IF and baseband processing unit 506. Frequency mixer 514 is located on the signal branch 508 between the LNA 513 and the IF and baseband processing unit 506. Frequency mixer 514 receives as an input the local oscillator signal from local oscillator 501.

Signal branch 509 is predominantly the transmit signal path. Signal branch 509 comprises inductor 502 located adjacent to pin 504. Inductor 503 and capacitor 515 are connected in series and collectively couple signal branch 509 to ground between inductor 502 and IF and baseband processing unit 507. Inductor 516 and capacitor 517 are connected in parallel to each other on signal branch 509 between the inductor 503 and capacitor 515 pair and IF and baseband processing unit 507. Capacitor 518 is located on the signal branch 509 between the inductor 516 and capacitor 517 pair and IF and baseband processing unit 507. Switch 519 couples the signal branch 509 to ground between capacitor 518 and IF and baseband processing unit 507. Frequency mixer 520 is located on the signal branch 509 between the switch 519 and the IF and baseband processing unit 507. Frequency mixer 520 receives as an input the local oscillator signal from local oscillator 501.

Suitably, the inductor 301 and local oscillator circuitry 304 is local oscillator 501 of FIG. 5. This local oscillator 501 drives both the frequency mixer 514 of the receive chain and the frequency mixer 520 of the transmit chain of the transceiver circuitry. Suitably, the inductor 302 of FIG. 3 is inductor 502 of FIG. 5. Suitably, the inductor 303 of FIG. 3 is inductor 503 of FIG. 5. Inductors 502 and 503 are adjacent to each other. Inductors 502 and 503 are connected in series.

The number of turns $n_1$ that inductor 302 has, the number of turns $n_2$ that inductor 303 has, the distance between inductor 302 and inductor 301 $r_1$, the distance between inductor 303 and inductor 301 $r_2$, the effective radius of inductor 302 $R_1$, the effective radius of inductor 303 $R_2$, the current through inductor 302 $i_1$ and the current through inductor 303 $i_2$ satisfy the relationship expressed in equations 6 and 7. If this relationship is not satisfied, then the magnetic coupling of inductor 302 to inductor 301 is not negated by the magnetic coupling of inductor 303 to inductor 301. Thus, the current through inductors 302 and 303 induces a current in inductor 301. This induced current has the same frequency but a different phase to the current in the local oscillator inductor 301 and thus has the effect of pulling the local oscillator. In other words, the resonant frequency of the local oscillator is changed as a result of the current induced by the inductors 302 and 303 if the relationship expressed in equations 6 and 7 is not satisfied. In an attempt to reduce the pulling problem, the local oscillator may be run at a different frequency to that of the transmit inductors. This reduces the magnitude of the pulling because the induced current is then not at the resonant frequency of the oscillator. If the local oscillator is run at a different frequency to that of the transmit inductors, then the output of the local oscillator is frequency shifted before being used to drive the frequency mixer in the transmit chain. This requires the use of additional circuit components which use power and area on chip. By configuring the inductors 301, 302 and 303 as described herein, the pulling of the local oscillator is significantly reduced. This enables the transmit inductors 302 and 303 and the local oscillator inductor 301 to all be run at the same frequency. Thus, no extra circuit components are used to overcome the pulling problem.

Figure 4:
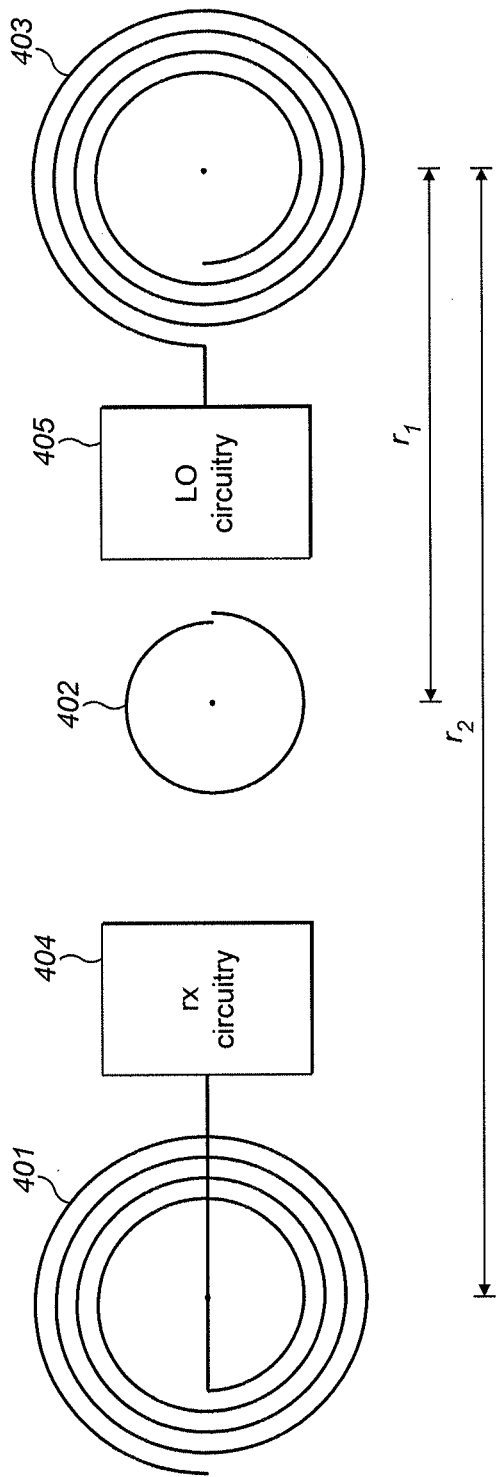
FIG. 4 illustrates an exemplary inductor configuration in receiver circuitry on an integrated circuit chip.

Turning to FIG. 4, FIG. 4 illustrates an implementation of the described inductor configuration in receiver circuitry on an integrated circuit chip. FIG. 4 illustrates three spiral inductors, inductors 401, 402 and 403. Inductor 401 forms part of the receive chain. In other words, inductor 401 is located on the receive signal path. Inductor 401 is connected at one end to on-chip receive circuitry 404. This on-chip receive circuitry 404 includes, for example, IF and baseband processing. Suitably, on-chip receive circuitry 404 includes an LNA stage.

Inductor 403 forms part of a local oscillator. Inductor 403 is connected at one end to further local oscillator circuitry 405. Suitably, the local oscillator drives a frequency mixer on the receive signal path. The local oscillator may also drive a frequency mixer on the transmit signal path.

Inductor 402 is a small inductor located closer to inductor 403 than inductor 401. Inductor 402 is very small compared to inductor 401. Inductors 402 and 401 are connected in series such that when current flows around inductor 402 in one rotational direction, it flows around inductor 401 in the opposite rotational direction. Suitably, inductor 402 is connected to receive circuitry 404. Alternatively, inductor 402 may be an additional component not incorporated directly into either the receive circuitry or the transmit circuitry.

Suitably, the inductor arrangement of FIG. 4 is incorporated into the exemplary transceiver circuitry of FIG. 5. Suitably, the inductor 403 and local oscillator circuitry 405 is local oscillator 501 of FIG. 5. This local oscillator 501 drives both the frequency mixer 514 of the receive chain and the frequency mixer 520 of the transmit chain of the transceiver circuitry. Suitably, the inductor 401 of FIG. 4 is inductor 510 of FIG. 5. Suitably, the inductor 402 of FIG. 4 is the inductor 521 of FIG. 5. Inductors 521 and 510 are adjacent to each other. Inductors 521 and 510 are connected in series. During reception of a signal by the transceiver circuitry of FIG. 5, the switch 519 is closed. This isolates the received signal from the transmitter circuitry in IF and baseband processing unit 507. Inductor 521 does form part of the receive signal chain. Inductor 521 also forms part of the transmit signal chain.

The number of turns $n_1$ that inductor 402 has, the number of turns $n_2$ that inductor 401 has, the distance between inductor 402 and inductor 403 $r_1$, the distance between inductor 403 and inductor 401 $r_2$, the effective radius of inductor 402 $R_1$, the effective radius of inductor 401 $R_2$ satisfy a similar relationship to that relationship expressed in equations 6 and 7 with the current scaling factor absent. If this relationship is not satisfied, then the magnetic coupling of inductor 403 to inductor 401 is not negated by the magnetic coupling of inductor 402 to inductor 401. Thus, the current through inductors 402 and 403 induces a current in inductor 401. When local oscillator 501 is driving frequency mixer 520 in the transmit chain, it utilises a high current because the transmitted signal requires a high power. This means the inductor 403 of the local oscillator 501 magnetically couples strongly to other inductors around it, including receive inductor 401 which is inductor 510. Thus a signal at the frequency of the local oscillator is induced in inductor 401/510. Inductor 510 forms a resonant circuit with capacitor 511. Thus, during signal transmission the resonant frequency of the resonant circuit comprising inductor 510 and capacitor 511 is strongly pulled by inductor 403 of local oscillator 501, if the relationship expressed in equations 4 and 5 is not satisfied. Since the transmitted signal has a high power, this pulling can overload the receive chain. A filter can be used to filter out the additional induced frequency in inductor 401/510. Additionally, local oscillator inductor 403 and receive inductor 401 can be spaced apart so as to reduce the pulling effect. However, this means that the local oscillator signal needs to be sent across a larger distance to reach the receive frequency mixer 514. Thus, extra circuitry for buffering the local oscillator signal is used. Thus, additional circuit components which use power and area on chip are used.

By utilising inductor 402 to negate the magnetic coupling of inductor 403 with inductor 401, the spurious signal generated in inductor 401 is significantly reduced. This means that the local oscillator inductor 403 can be located closer to the receive inductor 401 than in previous designs whilst significantly reducing the unwanted interference in the receive inductor 401. Since the receive inductor 401 and the local oscillator inductor 403 are both required for operation of the receive chain, it is desirable to locate them close together. Inductor 402 may be an additional small inductor incorporated on the chip in order to enable the local oscillator inductor 403 and receive inductor 401 to be located closer to each other on the integrated circuit chip. Thus, the inductor 402 may perform no other function than negating the magnetic coupling of inductor 403 to inductor 401. Nevertheless, the use of inductor 403 may reduce the overall area utilised, because it enables inductors 401 and 403 to be located closer together.

The inductors may be defined by, and preferably exclusively by, electrically conductive material: preferably material metallic leads or tracks. Preferably the leads or tracks are defined on or through a substrate of electrically insulating material.

Suitably, the inductors described herein are formed by metallisation on a substrate. Suitably, the inductors of the described inductor configurations are located on the same plane.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An integrated circuit chip comprising:
a first inductor;
a second inductor having $n_1$ turns and located a distance $r_1$ from the first inductor; and
a third inductor having $n_2$ turns and located a distance $r_2$ from the first inductor;
wherein the second and third inductors are coupled so as to cause current to circulate around the second inductor in a first rotational direction and around the third inductor in a second rotational direction opposite to the first rotational direction; and
wherein $n_1$, $n_2$, $r_1$ and $r_2$ are such that current induced in the first inductor due to magnetic coupling from the second inductor is negated by current induced in the first inductor due to magnetic coupling from the third inductor;
transmitter circuitry having a transmit signal path, wherein the second inductor and the third inductor are located on the transmit signal path; and
a local oscillator configured to drive a frequency mixer on the transmit signal path, wherein the local oscillator comprises the first inductor,
wherein the first, second and third inductors are configured to operate at a same frequency.

2. The integrated circuit chip as claimed in claim 1, wherein the second inductor and the third inductor are connected in series.

3. The integrated circuit chip as claimed in claim 1, further comprising a local oscillator configured to drive a frequency mixer on the receive signal path, wherein the local oscillator comprises the third inductor.

4. The integrated circuit chip as claimed in claim 3, wherein the local oscillator is further configured to drive a frequency mixer on the transmit signal path.

5. The integrated circuit chip as claimed in claim 3, wherein the first inductor is located on the receive signal path.

6. The integrated circuit chip as claimed in claim 3, wherein the second inductor is located on the receive signal path.

7. The integrated circuit chip as claimed in claim 6, wherein the second inductor is also located on a transmit signal path.

8. The integrated circuit chip as claimed in claim 1, wherein the second inductor comprises a first turn and one or more further turns, each of the one or more further turns circumscribing the first turn.

9. The integrated circuit chip as claimed in claim 1, wherein the third inductor comprises a first turn and one or more further turns, each of the one or more further turns circumscribing the first turn.

10. The integrated circuit chip as claimed in claim 1, wherein the second inductor has a spiral shape.

11. The integrated circuit chip as claimed in claim 1, wherein the third inductor has a spiral shape.

12. The integrated circuit chip as claimed in claim 1, wherein the first inductor has a spiral shape.

13. The integrated circuit chip as claimed in claim 1, wherein the first inductor, the second inductor and the third inductor are formed by metallisation on a substrate.

14. The integrated circuit chip as claimed in claim 1, wherein the first inductor, the second inductor and the third inductor are located on the same plane.

15. An integrated circuit chip comprising:

a first inductor;

a second inductor having $n_1$ turns and located a distance $r_1$ from the first inductor; and a third inductor having $n_2$ turns and located a distance $r_2$ from the first inductor;

wherein the second and third inductors are coupled so as to cause current to circulate around the second inductor in a first rotational direction and around the third inductor in a second rotational direction opposite to the first rotational direction; and wherein $n_1$, $n_2$, $r_1$ and $r_2$ are such that current induced in the first inductor due to magnetic coupling from the second inductor is negated by current induced in the first inductor due to magnetic coupling from the third inductor, wherein $$\frac{n_1}{r_1^3} = \frac{n_2}{r_2^3}.$$

* * * * *